Dec. 29, 1959  H. J. SCHULTZ  2,918,968
SUPPORTING AND TILTING MEANS FOR VENETIAN BLINDS
Filed Aug. 8, 1956
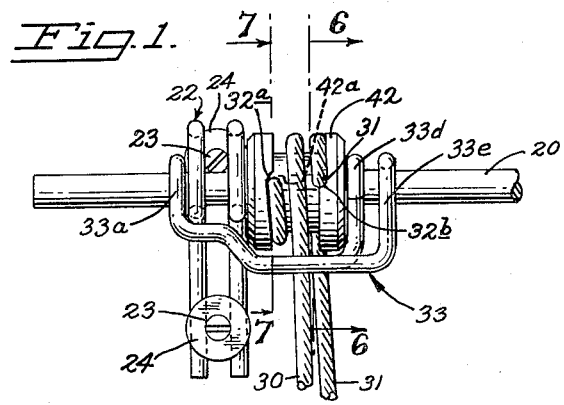
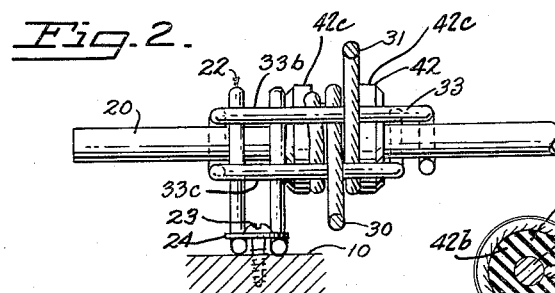
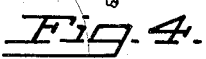
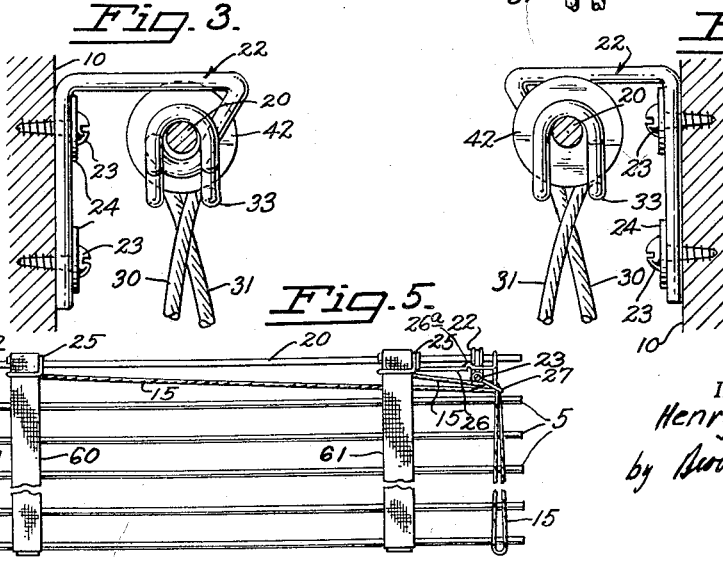
INVENTOR,
Henry J. Schultz
by Brooks Walker United States Patent Office 2,918,968
Patented Dec. 29, 1959

2,918,968

SUPPORTING AND TILTING MEANS FOR VENETIAN BLINDS

Henry J. Schultz, Hayward, Calif., assignor to Brooks Walker, San Francisco, Calif.

Application August 8, 1956, Serial No. 602,891

4 Claims. (Cl. 160—177)

This invention pertains to tilt mechanisms for Venetian blinds where the tilt rod turns more than once to tilt the ladder tapes from one fully tilted position to the other fully tilted position, and to a simplified and improved Venetian blind with a reduced number of parts to be painted, plated, etc.

One feature of this invention is to form a very simple inexpensive tilt rod rotating mechanism including a cord guard and a supporting bracket formed from heavy wire with no waste of material and no sharp edges to chafe or cut the tilt cord and wherein the tilting roller comprises elastic moulded pulley.

A further object of this invention is to utilize a pulley of elastomeric material on which the tilt cords are wound in such a way that no slippage of the tilt cords relative to the pulley may occur.

Another object of the invention is to provide a tilt rod rotating device that can be used at the right or left end of the tilt rod and is easily positioned at any desired distance from the end of the tilt rod when assembling the blind. The pulley when secured to the tilt rod positions the tilt rod relative to the support brackets.

Another object of the invention is to provide a tilt cord guard that acts as a cage and guides the tilt cord in its rotation of the pulley that is mounted on the tilt rod so that the tilt cord will not climb on top of coils of said tilt cord already on said pulley.

Another object of the invention is to provide a tilt rod support bracket in which the tilt and cord lock mechanism locks the tilt rod against accidental disengagement with the support brackets during normal operation and still allows removal of the tilt cord by rotating the tilt cage and cord lock toward the back, or window.

Other objects of the invention will be more particularly pointed out in the accompanying specifications and claims.

I have illustrated my invention by way of example in the accompanying drawing, in which:

Fig. 1 is a side elevation of a portion of a tilting mechanism incorporating one form of my inventon.

Fig. 2 is a view from below Fig. 1.

Fig. 3 is a view from the left of Fig. 1.

Fig. 4 is a view from the right of Fig. 1.

Fig. 5 is a side elevation of a Venetian blind in reduced scale employing the form of the invention shown in Figs. 1, 2, 3, and 4.

Fig. 6 is a section on the line 6—6 of Fig. 1, looking in the direction of the arrows; and Fig. 7 is a section on the line 7—7 of Fig. 1, looking in the directions of the arrows.

In all figures like numerals of reference refer to corresponding parts in the various views.

Referring to all figures, I have shown a Venetian blind with slats 5, ladder tapes 60 and 61, lift cord turns and tape guides 25. Said lift cord turns and tape guides 25 are shown and described more fully in my copending application entitled "Venetian Blind," Serial No. 546,420, now Patent No. 2,842,196, issued July 8, 1958, since these elements form no part of the present invention further description is unnecessary. Tilt rod 20 is mounted in support brackets 22 near each end of rod 20. The brackets 22 are the same for left or right and suitable for mounting from the rear or from above the tilt rod. The upper looped and joined sides of the ladder tapes 30 and 31 may be supported on the tilt rod 20 and positioned by brackets 25, as shown in said application. Lift cords 15 go through a cord lock 27 which is spaced from the right hand ladder tape guide 25 by spacer wire 26 which is provided with a loop at each end, said loops passing around tilt rod 20 to space cord lock 27 from guide 25 and resist the pull of lift cord 15 which would tend to pull cord lock 27 toward guide 25 when the blind is raised or held in the raised position. Spacer wire 26 has a hump 26a that rides against the lift support bracket 22 to prevent spacer wire 26 and cord lock 27 from moving to the right when cords 15 are pulled toward the right. Cord lock 27 and its support are shown in detail in said pending application, Ser. No. 546,420, now Patent No. 2,842,196, issued July 8, 1958, entitled "Venetian Blind." Cord lock 27 and spacer wire 26 can be used at the right or left of the blind.

Tilt cord guard 33 is formed from wire to offer a smooth surface to the lift cord and be inexpensive to make and be universal for use at the right or left end of the tilt rod. End 33a shown at the left in Fig. 1 loops over tilt rod 20. Two sides 33b and 33c of the cord guard 33 pass outside the cords 30 and 31 where they extend downward from rubberlike pulley 42, as seen in Fig. 2. The right hand ends 33d and 33e of the cord guard 33 loop up and over tilt rod 20 with space therebetween for the passage of cords 30 and 31 when assembling or disassembling. The lower side members 33b and 33c of the cord guard 33 pass close enough to pulley 42 so that two diameters of cords 30 and 31 cannot pass under either side at the same time. This keeps the winding up and unwinding of cords 30 and 31 on pulley 42 in an orderly manner.

Cord 30 is wound around pulley 42, then passed through a hole 32a in the pulley 42, thence along a groove 42a in the inner diameter of the pulley 42 and up through hole 32b to become cord 31, which then passes part way around pulley 32 and down between the sides 33b and 33c of the cord guard 33.

It is to be particularly observed that the pulley 42 comprises a solid cylindrical body portion 42b and opposite end tilt cord confining flanges 42c the body portion 42b is provided with a central tilt rod receiving bore 42d and that the above referred to groove 42a is disposed parallel to said bore 42d and adjacent same and that the said holes 32a, 32c are disposed axially of the said body portion and adjacent said flanges 42c.

By this method of lacing cords 30 and 31 (which are the ends of the same cord) through the pulley 32 as just described, a firm anchorage of said cords to pulley 32 is accomplished. The side flanges of pulley 42 are recessed near the holes 32a and 32b in opposite directions so that a smooth winding of the cords 30 and 31 results.

Supporting brackets 22 are formed of wire with a portion looped down under tilt rod 20 to form a support for tilt rod 20 and the rest of the Venetian blind. Screws 23 and washers 24 secure brackets 22 to the supporting wall 10, as shown in Figs. 1 and 2. If tilt cords 30 and 31 and pulley 42 get out of rotational place or phase in tilting tapes 60 and 61, continued pull in one direction will cause slippage of the tilt rod 20 under the looped upper ends of tapes 60 and 61 until cords 30 and 31 are fully unwound from pulley 32 for that direction of tilt. After that the pulley will be in phase with the tilt of tapes 60 and 61. This forms a tilt cord self-correcting mechanism that does not need other corrective measures such as a worm running off its gear as is common in Venetian blind tilt gears using a cord over a pulley where creep is possible. Cord guards 33 and spacer 26 lock tilt rod 20 to support brackets 22 in normal operating position and can be moved to the unlocked position by rotating the lower portion of each toward wall 10 for removal of tilt rod 20.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. In a Venetian blind having ladder tapes, slats, and a tilt rod, the improvement comprising rotating and supporting means for the tilt rod including a tilt pulley mounted on the tilt rod, a tilt cord guard means having a portion embracing the tilt rod at either side of the pulley, and having cord guard portions adjacent the periphery of the pulley, a tilt cord embracing the pulley, said guard portions being spaced from the periphery of the pulley less than twice the diameter of the tilt cord, the cord guard comprising a wire bent to have a mid-portion looped over and loosely embracing the tilt rod at one side of said pulley and the ends thereof bent into loops and looped over and loosely embracing the tilt rod at the opposite side of the pulley, the portions intermediate the mid-portion and the end portions constituting the cord guard portions.

2. The structure defined in claim 1 wherein a supporting bracket is embraced by a cord guard member between a pulley and the mid-portion loop of the guard member.

3. The structure as defined in claim 1, wherein the looped ends of the cord guard are spaced apart axially of the tilt rod to permit passage of the tilt cord in threading up.

4. In a Venetian blind having ladder tapes, slats, and a tilt rod, the improvement comprising tilt cord supporting means including a tilt pulley mounted on the tilt rod, said pulley comprising a solid cylindrical body portion and opposite end flanges, said body portion having a central tilt rod receiving bore, said body portion being further provided with a pair of radial openings disposed in spaced relation axially of the bore and adjacent said flanges, and a groove in said body portion adjacent said bore and in parallel relation to the axis thereof and communicating with corresponding ends of said openings, and a tilt cord passing about the pulley, thence into one of said radial openings, thence along the groove, and then out through the other radial opening and partly about the periphery of the pulley.

References Cited in the file of this patent

UNITED STATES PATENTS

| | | |
|---|---|---|
| 2,166,599 | Kuyper | July 18, 1939 |
| 2,190,884 | Rosenstein | Feb. 20, 1940 |
| 2,269,854 | Kuyper | Jan. 13, 1942 |
| 2,334,132 | Sherwood | Nov. 9, 1943 |
| 2,409,821 | Albrecht | Oct. 22, 1946 |
| 2,663,368 | Walker | Dec. 22, 1953 |
| 2,696,879 | Walker | Dec. 14, 1954 |
| 2,771,135 | Walker | Nov. 20, 1956 |